United States Patent
Geng et al.

(10) Patent No.: US 8,295,418 B2
(45) Date of Patent: Oct. 23, 2012

(54) ADJACENT CHANNEL INTERFERENCE DETECTION FOR WIRELESS COMMUNICATION

(75) Inventors: Jifeng Geng, San Diego, CA (US); Raghu Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 908 days.

(21) Appl. No.: 11/686,431

(22) Filed: Mar. 15, 2007

(65) Prior Publication Data
US 2008/0226001 A1 Sep. 18, 2008

(51) Int. Cl.
*H04B 1/10* (2006.01)
(52) U.S. Cl. ...................................................... 375/350
(58) Field of Classification Search .................. 375/261, 375/343, 350; 455/63.1, 296
See application file for complete search history.

(56) References Cited

U.S. PATENT DOCUMENTS

| | | | |
|---|---|---|---|
| 5,031,193 A * | 7/1991 | Atkinson et al. ............. | 375/231 |
| 5,734,639 A * | 3/1998 | Bustamante et al. ......... | 370/208 |
| 6,567,567 B1 * | 5/2003 | Levin et al. .................. | 382/284 |
| 6,944,434 B2 * | 9/2005 | Mattellini et al. ............ | 455/296 |
| 7,039,093 B2 | 5/2006 | Rouphael et al. | |
| 7,402,794 B2 * | 7/2008 | Kim et al. ..................... | 250/250 |
| 2001/0012788 A1 * | 8/2001 | Gammon ...................... | 455/562 |
| 2003/0087622 A1 * | 5/2003 | Jayaraman et al. .......... | 455/307 |
| 2005/0078777 A1 * | 4/2005 | He ................................. | 375/346 |
| 2006/0039506 A1 * | 2/2006 | D'Alessandro ............... | 375/324 |

FOREIGN PATENT DOCUMENTS
WO   WO2005002241 A2   1/2005

OTHER PUBLICATIONS

International Search Report/Written Opinion—PCT/US2008/056903—International Search Authority—European Patent Office—Dec. 3, 2008.
Taiwan Search Report-TW097109259-TIPO—Jul. 19, 2011.

\* cited by examiner

*Primary Examiner* — Leon-Viet Nguyen
(74) *Attorney, Agent, or Firm* — Kevin T. Cheatham

(57) ABSTRACT

Techniques for detecting adjacent channel interference (ACI) in a wireless communication system are described. Input inphase (I) and quadrature (Q) samples are filtered with a first filter response to obtain filtered I and Q samples. The first filter response is designed to pass signal in an adjacent frequency channel while suppressing signals in a desired frequency channel and non-adjacent frequency channels. Correlations of the filtered I and Q samples are determined. The presence of ACI is detected based on the correlations of the filtered I and Q samples and the power of the input I and Q samples. If ACI is present, then whether the ACI is from a higher frequency channel or a lower frequency channel is determined based on one or more of the correlations. The input I and Q samples are filtered with a second filter response that is adjusted based on the detection of ACI.

31 Claims, 11 Drawing Sheets

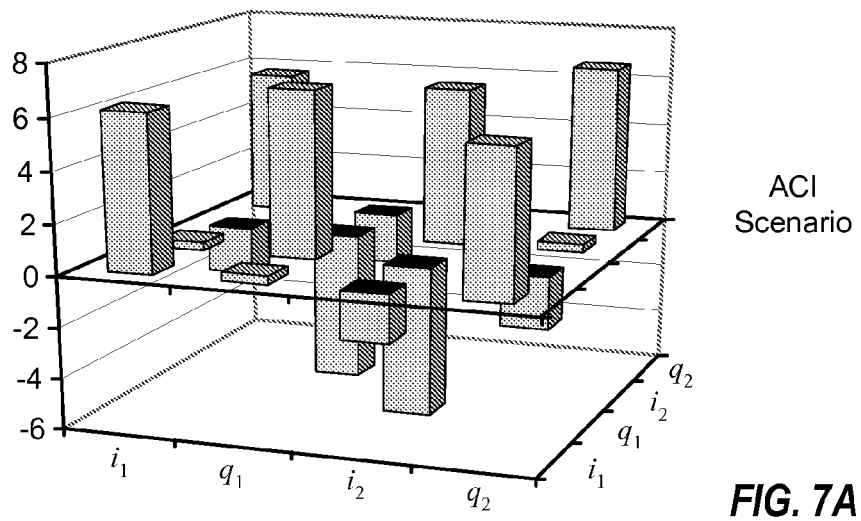
FIG. 7A ACI Scenario
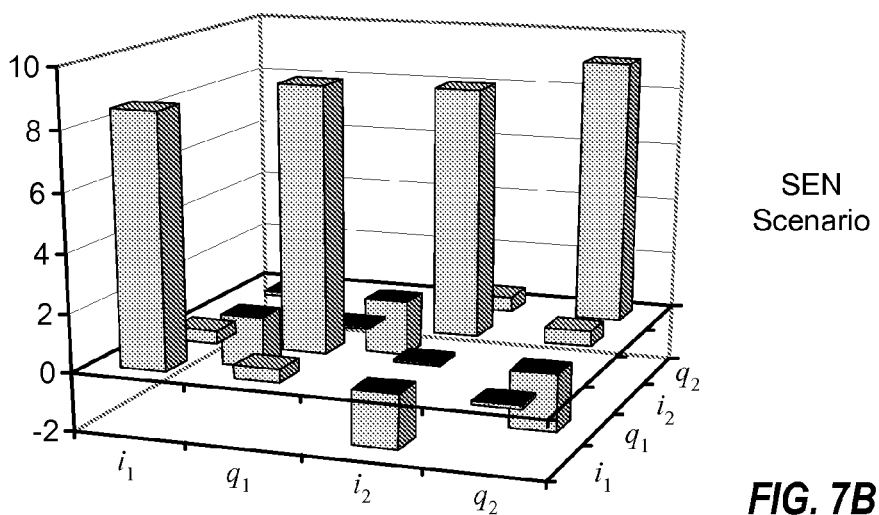
FIG. 7B SEN Scenario
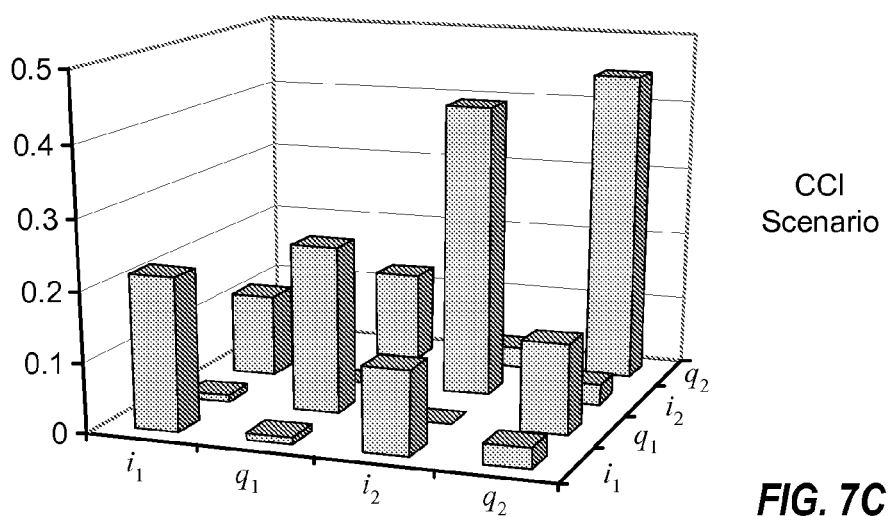
FIG. 7C CCI Scenario

ADJACENT CHANNEL INTERFERENCE DETECTION FOR WIRELESS COMMUNICATION

BACKGROUND

I. Field

The present disclosure relates generally to communication, and more specifically to techniques for detecting adjacent channel interference (ACI) in wireless communication.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A system typically operates in accordance with a particular symbol rate and a particular carrier spacing between radio frequency (RF) channels. The symbol rate determines the bandwidth of a modulated signal transmitted on an RF channel. The carrier spacing determines the distance between adjacent RF channels. The system typically specifies a transmit mask for the modulated signal. The transmit mask defines the maximum and minimum amplitude values for the modulated signal over a range of frequencies. The transmit mask typically limits the bandwidth of the modulated signal on each RF channel to half of the symbol rate or less. However, the transmit mask specification may not be stringent, and a portion of the modulated signal on each RF channel may "bleeds" onto adjacent RF channels. For a given RF channel, the signal bleeding from an adjacent RF channel is referred to as adjacent channel interference (ACI).

ACI is one of several components that make up the total noise and interference observed by a receiver. ACI may degrade the received signal quality of a modulated signal, which may then adversely impact performance. Various techniques may be used to mitigate the deleterious effects of ACI. These techniques may improve performance when ACI is present but may actually degrade performance when ACI is not present. Hence, accurate detection of ACI is highly desirable in order to activate the ACI mitigation techniques only when applicable.

SUMMARY

Techniques for detecting ACI in a wireless communication system are described herein. In one design, input inphase (I) and quadrature (Q) samples may be filtered with a first (e.g., highpass) filter response to obtain filtered I and Q samples. The first filter response may be designed to pass signal in an adjacent frequency channel while suppressing signals in a desired frequency channel as well as non-adjacent frequency channels. Correlations of the filtered I and Q samples may be determined. The filtered I and Q samples may be oversampled at multiple times symbol rate and may comprise $i_1$, $i_2$, $q_1$ and $q_2$ samples for two sampling instances of each symbol period. In this case, correlations of the $i_1$, $i_2$, $q_1$ and $q_2$ samples may be determined, as described below. The correlations may have distinctive patterns for different operating scenarios and may be exploited for ACI detection.

The presence of ACI may be detected based on the correlations of the filtered I and Q samples and the power of the input I and Q samples. For example, intermediate terms may be computed based on the correlations of the $i_1$, $i_2$, $q_1$ and $q_2$ samples and used to detect for the presence of ACI. If ACI is present, then whether the ACI is from a higher frequency channel or a lower frequency channel may be determined based on one or more of the correlations, e.g., the correlation between the $i_1$ and $q_2$ samples and/or the correlation between the $i_2$ and $q_1$ samples. The input I and Q samples may be filtered with a second filter response that may be adjusted based on the detection of ACI. For example, the second filter response may be shifted lower if ACI from the higher frequency channel is detected and shifted higher if ACI from the lower frequency channel is detected. Alternatively or additionally, the bandwidth of the second filter response may be adjusted if ACI is detected.

Various aspects and features of the disclosure are described in further detail below.

BRIEF DESCRIPTION OF THE DRAWINGS

FIGS. 7A, 7B and 7C show 3-D plots of the elements of a correlation matrix for three operating scenarios.

DETAILED DESCRIPTION

The ACI detection techniques described herein may be used for various wireless communication systems such as CDMA, FDMA, TDMA, OFDMA and SC-FDMA systems, broadcast systems, wireless local area networks (WLANs), etc. The terms "systems" and "networks" are often used interchangeably. A CDMA system may implement a radio technology such as cdma2000, Wideband-CDMA (W-CDMA), etc. cdma2000 covers IS-2000, IS-95, and IS-856 standards. A TDMA system may implement a radio technology such as Global System for Mobile Communications (GSM), Digital Advanced Mobile Phone System (D-AMPS), etc. These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. For clarity, the techniques are described below for GSM.

Figure 1:
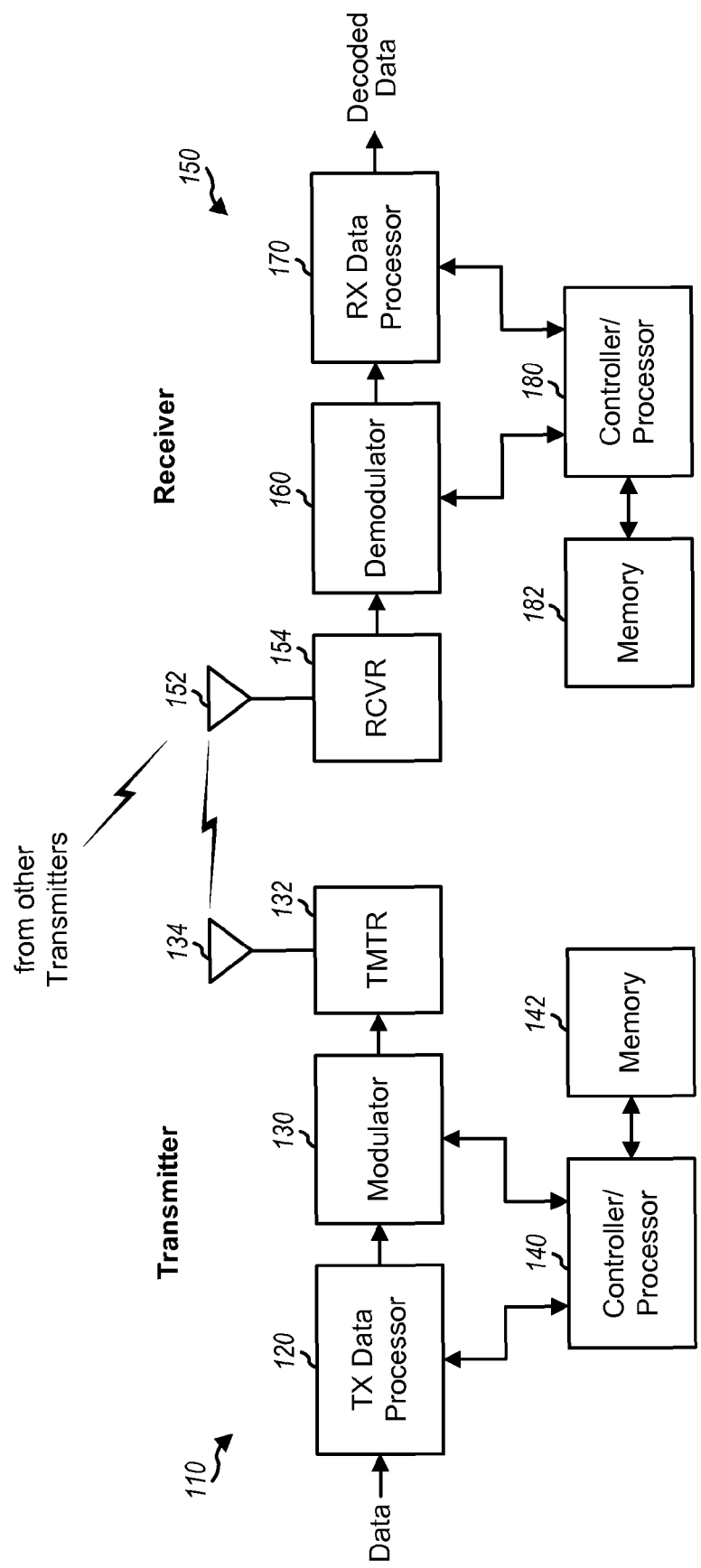
FIG. 1 shows a block diagram of a transmitter and a receiver.

FIG. 1 shows a block diagram of a transmitter 110 and a receiver 150 in a wireless communication system. For the downlink, transmitter 110 may be part of a base station, and receiver 150 may be part of a wireless device. For the uplink, transmitter 110 may be part of a wireless device, and receiver 150 may be part of a base station. A base station is generally a fixed station that communicates with the wireless devices and may also be referred to as a Node B, an evolved Node B (eNode B), an access point, etc. A wireless device may be stationary or mobile and may also be referred to as a mobile station, a user equipment, a mobile equipment, a terminal, an access terminal, a station, etc. A wireless device may be a cellular phone, a personal digital assistant (PDA), a wireless modem, a wireless communication device, a handheld device, a subscriber unit, a laptop computer, etc.

At transmitter 110, a transmit (TX) data processor 120 receives and processes (e.g., formats, encodes, and interleaves) data and provides coded data. A modulator 130 performs modulation on the coded data and provides a modulated signal. Modulator 130 may perform Gaussian minimum shift keying (GMSK) for GSM, 8-ary phase shift keying (8-PSK) for Enhanced Data rates for Global Evolution (EDGE), etc. GMSK is a continuous phase modulation scheme whereas 8-PSK is a digital modulation scheme. A transmitter unit (TMTR) 132 conditions (e.g., filters, amplifies, and upconverts) the modulated signal and generates an RF modulated signal, which is transmitted via an antenna 134.

At receiver 150, an antenna 152 receives RF modulated signals from transmitter 110 and other transmitters. Antenna 152 provides a received RF signal to a receiver unit (RCVR) 154. Receiver unit 154 conditions (e.g., filters, amplifies, and downconverts) the received RF signal, digitizes the conditioned signal, and provides samples. A demodulator 160 processes the samples as described below and provides demodulated data. A receive (RX) data processor 170 processes (e.g., deinterleaves and decodes) the demodulated data and provides decoded data. In general, the processing by demodulator 160 and RX data processor 170 is complementary to the processing by modulator 130 and TX data processor 120, respectively, at transmitter 110.

Controllers/processors 140 and 180 direct operation at transmitter 110 and receiver 150, respectively. Memories 142 and 182 store program codes and data used by transmitter 110 and receiver 150, respectively.

Figure 2:
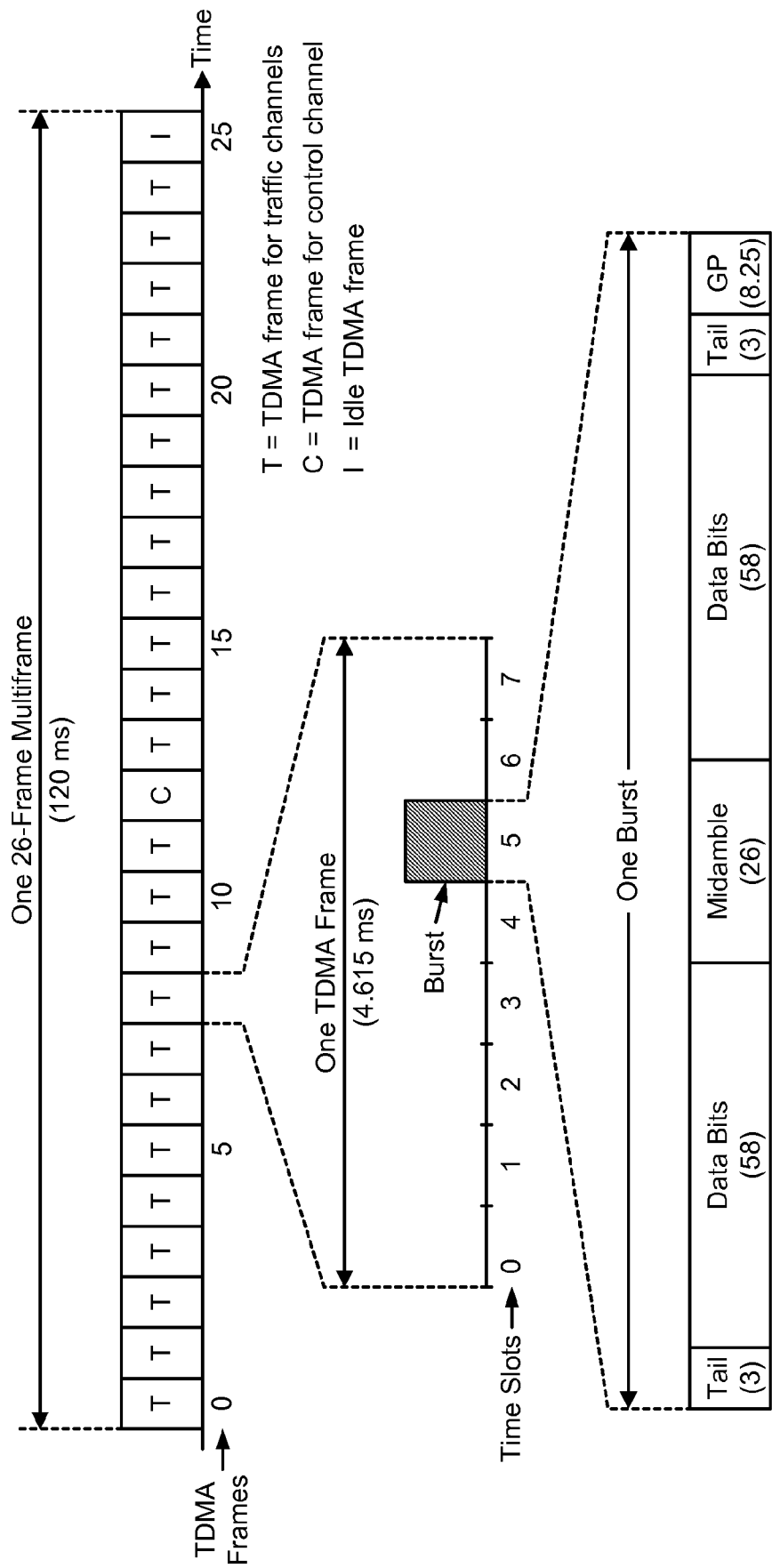
FIG. 2 shows example frame and burst formats in GSM.

FIG. 2 shows example frame and burst formats in GSM. The timeline for transmission is divided into multiframes. For traffic channels used to send user-specific data, each multiframe includes 26 TDMA frames, which are labeled as TDMA frames 0 through 25. The traffic channels are sent in TDMA frames 0 through 11 and TDMA frames 13 through 24 of each multiframe. A control channel is sent in TDMA frame 12. No data is sent in idle TDMA frame 25, which is used by the wireless devices to make measurements for neighbor base stations.

Each TDMA frame is partitioned into eight time slots, which are labeled as time slots 0 through 7. Each active wireless device/user is assigned one or more time slot indices for the duration of a call. User-specific data for each wireless device is sent in the time slot(s) assigned to that wireless device and in TDMA frames used for the traffic channels. The transmission in each time slot is called a "burst" in GSM. Each burst includes two tail fields, two data fields, a training sequence (or midamble) field, and a guard period (GP). The number of symbols in each field is shown inside the parentheses. A burst includes 148 symbols for the tail, data, and midamble fields. No symbols are sent in the guard period.

A GSM system may operate in a frequency band such as GSM 850, GSM 900, GSM 1800, GSM 1900, etc. Each frequency band covers a number of 200 KHz RF channels, which are also referred to as GSM channels, frequency channels, etc. Each RF channel is identified by a specific ARFCN (absolute radio frequency channel number). For example, the GSM 900 band covers ARFCNs 1 through 124, the GSM 850 band covers ARFCNs 128 through 251, the GSM 1800 band covers ARFCNs 512 through 885, and the GSM 1900 band covers ARFCNs 512 through 810. A GSM system typically operates on a specific set of RF channels in a specific frequency band.

Figure 3A:
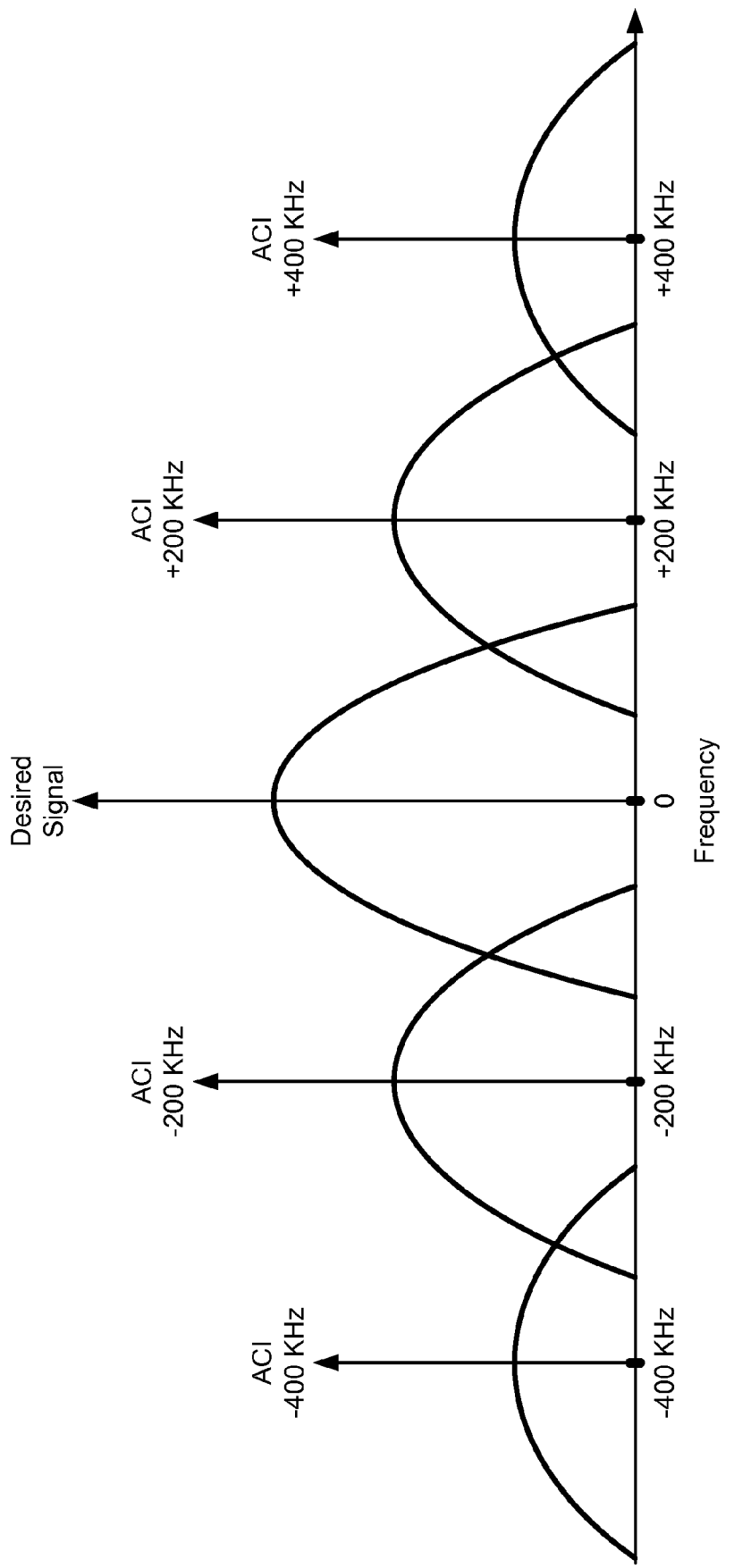
FIGS. 3A and 3B show an example spectrum in a GSM system.

FIG. 3A shows an example spectrum in a GSM system. In this example, five RF modulated signals are transmitted on five RF channels that are spaced apart by 200 KHz. The RF channel of interest is shown with a center frequency of 0 Hz. The two adjacent RF channels have center frequencies that are +200 KHz and −200 KHz from the center frequency of the desired RF channel. The next two nearest RF channels (which are referred to as blockers or non-adjacent RF channels) have center frequencies that are +400 KHz and −400 KHz from the center frequency of the desired RF channel. There may be other RF channels in the spectrum, which are not shown in FIG. 3A for simplicity. In GSM, an RF modulated signal is generated with a symbol rate of $f_{sym}$=13000/40=270.8 kilo symbols/second (Ksps) and has a −3 dB bandwidth of up to ±135 KHz. The RF modulated signals on adjacent RF channels may thus overlap one another at the edges, as shown in FIG. 3A.

Figure 4:
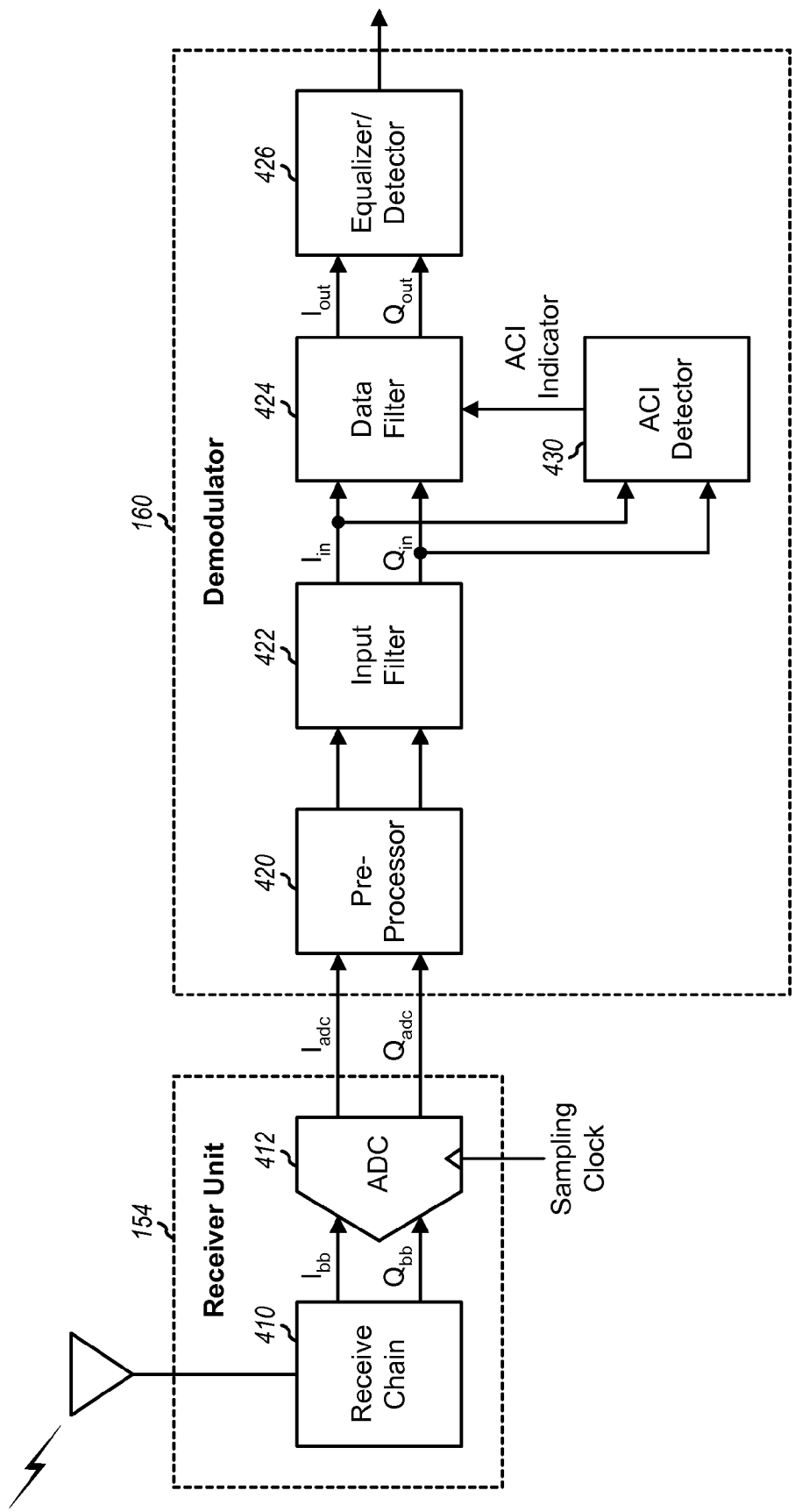
FIG. 4 shows a block diagram of a receiver unit and a demodulator.

FIG. 4 shows a block diagram of a design of receiver unit 154 and demodulator 160 at receiver 150 in FIG. 1. Within receiver unit 154, a receive chain 410 processes the received RF signal and provides I and Q baseband signals, which are denoted as $I_{bb}$ and $Q_{bb}$. Receive chain 410 may perform low noise amplification, analog filtering, quadrature downconversion, etc. An analog-to-digital converter (ADC) 412 digitalizes the I and Q baseband signals at a sampling rate of $f_{adc}$ and provides I and Q samples, which are denoted as $I_{adc}$ and $Q_{adc}$. In general, the ADC sampling rate $f_{adc}$ may be related to the symbol rate $f_{sym}$ by any integer or non-integer factor.

Within demodulator 160, a pre-processor 420 performs pre-processing on the I and Q samples from ADC 412. For example, pre-processor 420 may remove direct current (DC) offset, remove frequency offset, etc. An input filter 422 filters the samples from pre-processor 420 based on a particular frequency response and provides input I and Q samples, which are denoted as $I_{in}$ and $Q_{in}$. Filter 422 may filter the I and Q samples to suppress images resulting from the sampling by ADC 412 as well as jammers. Filter 422 may also perform sample rate conversion, e.g., from 24× oversampling down to 2× oversampling. A data filter 424 filters the input I and Q samples from input filter 422 based on another frequency response and provides output I and Q samples, which are denoted as $I_{out}$ and $Q_{out}$. Filters 422 and 424 may be implemented with finite impulse response (FIR) filters, infinite impulse response (IIR) filters, or filters of other types. The frequency responses of filters 422 and 424 may be selected to achieve good performance. In one design, the frequency response of filter 422 is fixed, and the frequency response of filter 424 is configurable.

An ACI detector 430 receives the input I and Q samples from filter 422, detects for ACI in the received RF signal, and provides an ACI indicator to filter 424. The ACI indicator may indicates whether or not ACI is present and, if present, whether the ACI is due to the higher RF channel centered at +200 KHz and/or the lower RF channel centered at −200 KHz. The frequency response of filter 424 may be adjusted based on the ACI indicator, as described below, to achieve good performance.

An equalizer/detector 426 receives the output I and Q samples from filter 424 and performs equalization, matched filtering, detection, and/or other processing on these samples. For example, equalizer/detector 426 may implement a maximum likelihood sequence estimator (MLSE) that determines a sequence of symbols that is most likely to have been transmitted given a sequence of I and Q samples and a channel estimate. Equalizer/detector 426 may also perform co-channel interference (CCI) cancellation prior to equalization, detection, etc. Equalizer/detector 426 provides demodulated data.

Figure 5:
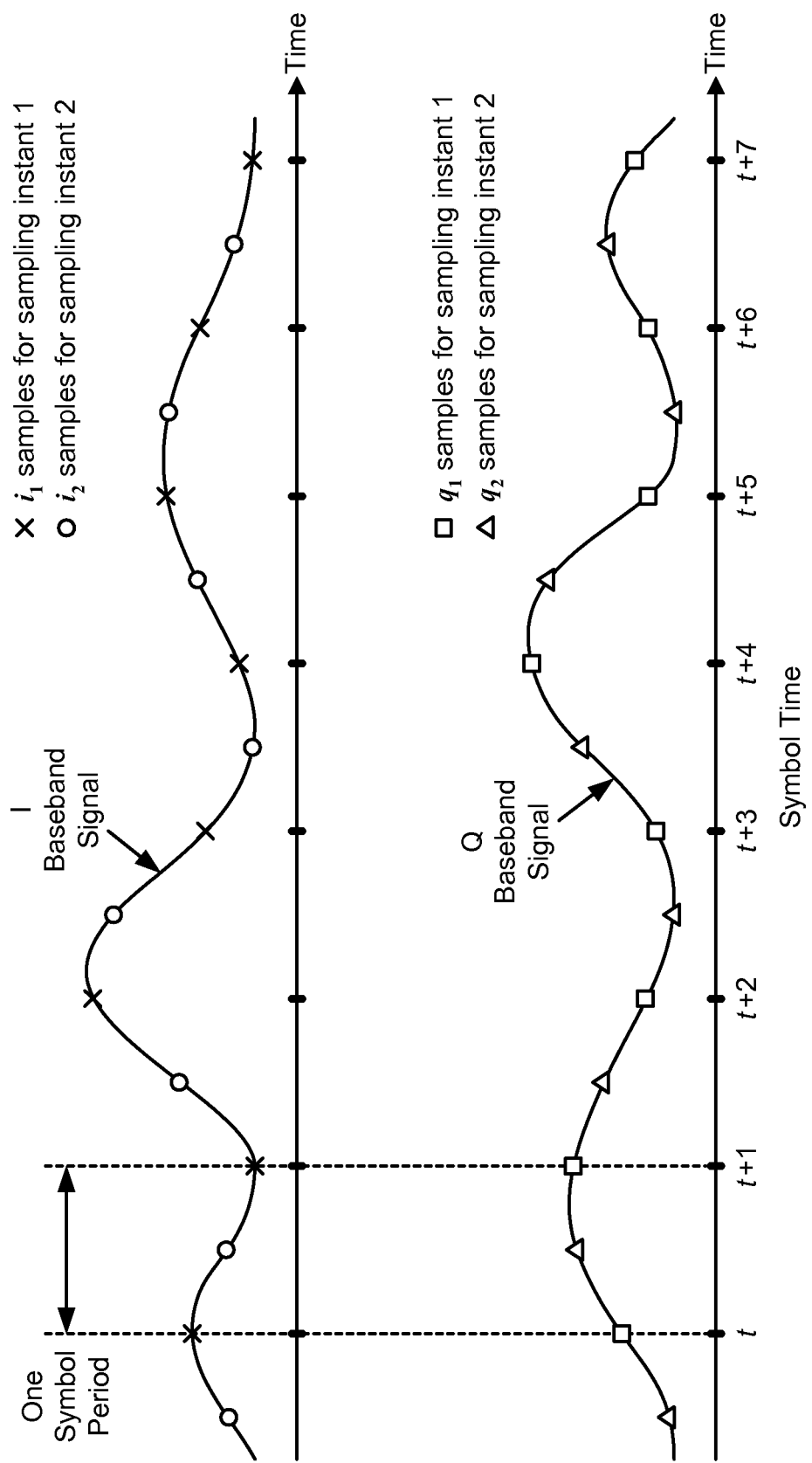
FIG. 5 shows I and Q samples with 2× oversampling.

FIG. 5 shows a sequence of I samples and a sequence of Q samples with 2× oversampling. The I and Q baseband signals may be digitized at multiple times the symbol rate by ADC 412. Pre-processor 420 and/or input filter 422 may process the I and Q samples from ADC 412 and provide input I and Q samples at twice the symbol rate, or 2× samples. For the I sample sequence, two samples $i_1(t)$ and $i_2(t)$ are obtained at two sampling instances of each symbol period t, with the $i_2(t)$ sample being one half symbol period later than the $i_1(t)$ sample. For the Q sample sequence, two samples $q_1(t)$ and $q_2(t)$ are obtained at two sampling instances of each symbol period t, with the $q_2(t)$ sample being one half symbol period later than the $q_1(t)$ sample.

Figure 3B:
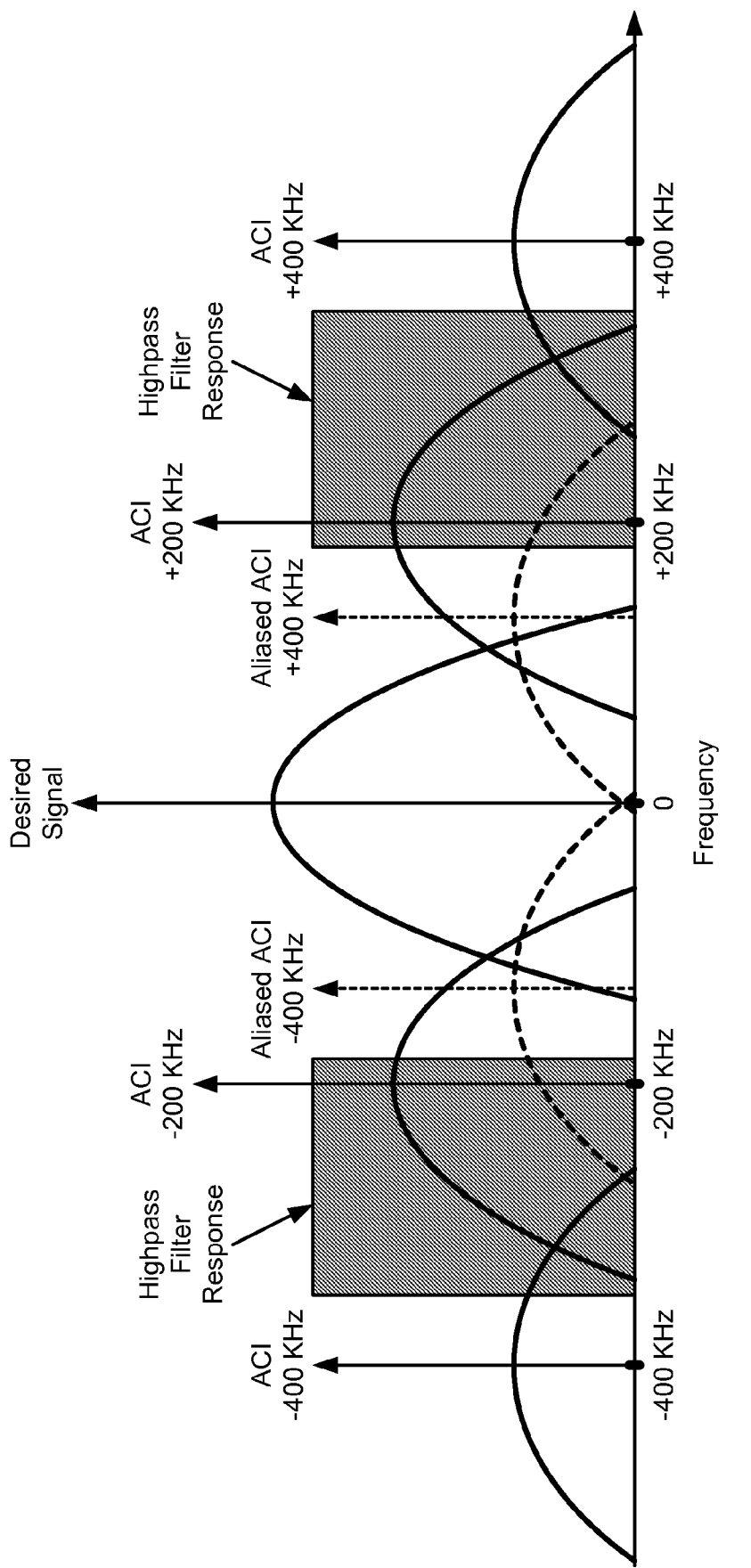

FIG. 3B shows the spectrum after digitization. 2× oversampling with a sampling rate of $f_{samp}$=540 KHz results in aliasing of the ACI at +400 KHz. In particular, the signal component at +400 KHz appears at +140 KHz and the signal component at −400 KHz appears at −140 KHz due to aliasing.

Figure 6:
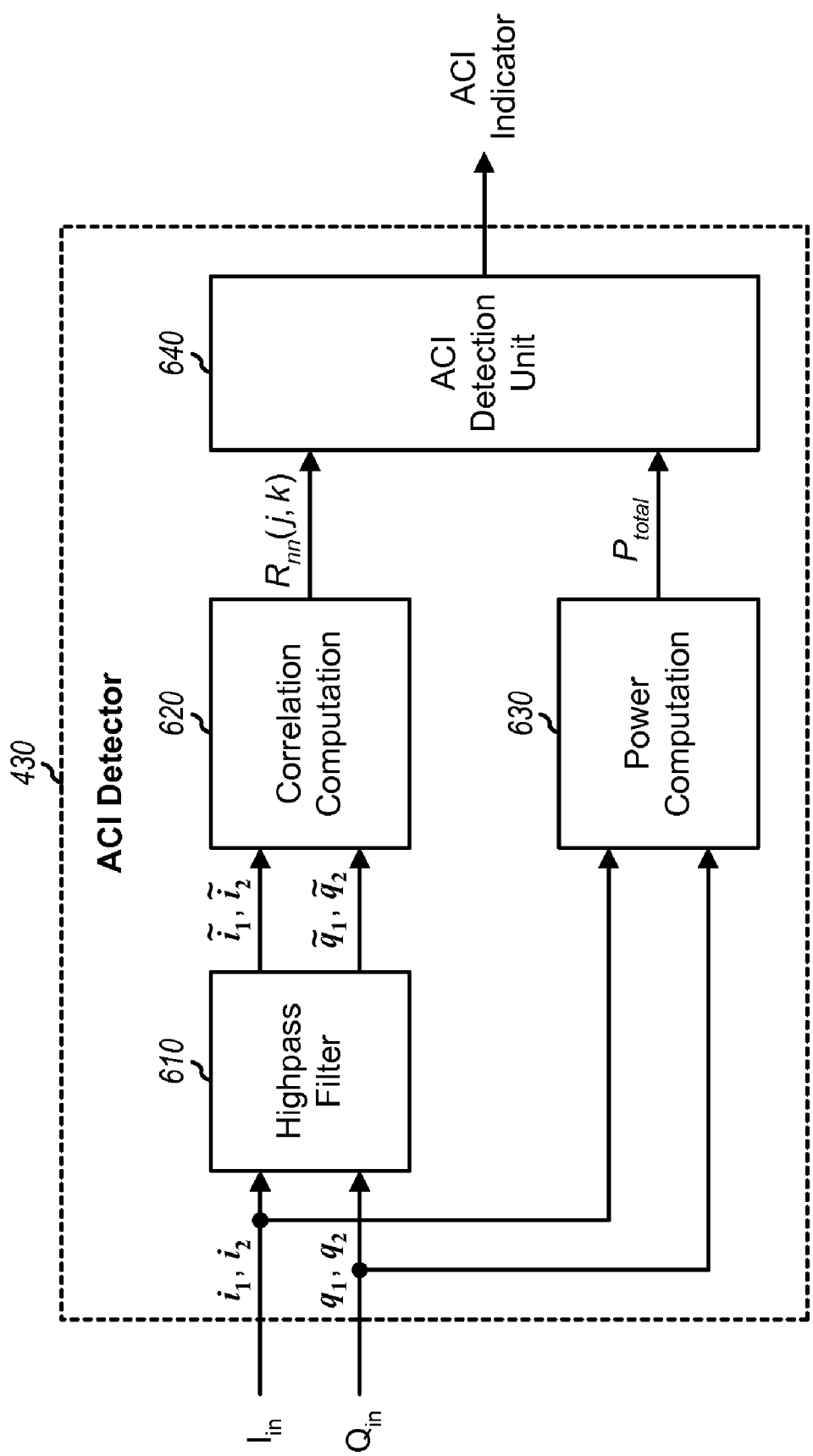
FIG. 6 shows a block diagram of an ACI detector.

FIG. 6 shows a block diagram of a design of ACI detector 430 in FIG. 4. Within ACI detector 430, a highpass filter 610 receives the input I and Q samples from input filter 422, filters the samples based on a highpass response, and provides filtered I and Q samples. Filter 610 suppresses inband signal and possible CCI and blocker components and may be implemented with an IIR filter, a FIR filter, etc. The filtered I and Q samples from filter 610 contain mostly noise and, if present, signals from nearby RF channels. A correlation computation unit 620 computes the correlations of the filtered I and Q samples, as described below. Correlations and covariances are equivalent when the mean is zero. A power computation unit 630 computes the total power of the input I and Q samples. An ACI detection unit 640 receives the correlations from unit 620 and the total power from unit 630, determines whether or not ACI is present, and provides the ACI indicator.

The input I and Q samples received by highpass filter 610 may be given as:

$$\underline{v}(t) = [i_1(t)\ q_1(t)\ i_2(t)\ q_2(t)]^T, \qquad \text{Eq (1)}$$

where v(t) is a 4×1 vector with four input samples for one symbol period t, and "T" denotes a transpose.

Unit 630 may compute the total power of the input I and Q samples, as follows:

$$P_{total} = \frac{1}{4N} \cdot \sum_{t=1}^{N} [i_1^2(t) + q_1^2(t) + i_2^2(t) + q_2^2(t)], \qquad \text{Eq (2)}$$

where $P_{total}$ is the total power of the input samples and N is the number of symbol periods over which the total power is computed.

In general, N may be any value. In one design, N is equal to the number of symbol periods in all time slots allocated for transmission in each TDMA frame. For example, N may be equal to approximately 150 for one time slot, 300 for two time slots, etc. In another design, N is equal to a fraction of the number of symbol periods in the allocated time slots. For example, N may be equal to approximately 75 if only half of the samples in one time slot are processed for ACI detection.

In general, ACI detection performance may improve for larger N while computation complexity may be reduced for smaller N.

The filtered I and Q samples from highpass filter 610 may be given as:

$$\underline{\tilde{v}}(t) = [\tilde{i}_1(t)\ \tilde{q}_1(t)\ \tilde{i}_2(t)\ \tilde{q}_2(t)]^T, \qquad \text{Eq (3)}$$

where $\tilde{v}(t)$ is a 4×1 vector with four filtered samples for one symbol period t.

Unit 620 may compute a correlation matrix $\underline{R}_{nn}$ based on the filtered I and Q samples, as follows:

$$\underline{R}_{nn} = \frac{1}{N} \cdot \sum_{t=1}^{N} \underline{\tilde{v}}(t)\underline{\tilde{v}}^T(t), \qquad \text{Eq (4)}$$

where $R_{nn}$ is a 4×4 matrix containing 16 elements $R_{nn}(j, k)$, for j, k=1, 2, 3, 4.

$R_{nn}(j, k)$ is the element in the j-th row and k-th column of $R_{nn}$ and is indicative of the correlation between the j-th and k-th elements of $\tilde{v}(t)$. $R_{nn}(j, k)$ may be obtained by (a) multiplying the j-th element of $\tilde{v}(t)$ with a complex conjugate of the k-th element of $\tilde{v}(t)$ for each symbol period t and (b) averaging the results over N symbol periods. The elements of $R_{nn}$ may be expressed as:

$$R_{nn}(1,1) = \Sigma \tilde{i}_1(t)\cdot\tilde{i}_1^*(t),\ R_{nn}(2,2) = \Sigma \tilde{q}_1(t)\cdot\tilde{q}_1^*(t), \qquad \text{Eq (5)}$$

$$R_{nn}(3,3) = \Sigma \tilde{i}_2(t)\cdot\tilde{i}_2^*(t),\ R_{nn}(4,4) = \Sigma \tilde{q}_2(t)\cdot\tilde{q}_2^*(t),$$

$$R_{nn}(1,2) = \Sigma \tilde{i}_1(t)\cdot\tilde{q}_1^*(t),\ R_{nn}(1,3) = \Sigma \tilde{i}_1(t)\cdot^*\tilde{i}_2^*(t),$$

$$R_{nn}(1,4) = \Sigma \tilde{i}_1(t)\cdot\tilde{q}_2^*(t),\ R_{nn}(2,3) = \Sigma \tilde{q}_1(t)\cdot^*\tilde{i}_2^*(t),$$

$$R_{nn}(2,4) = \Sigma \tilde{q}_1(t)\cdot\tilde{q}_2^*(t),\ R_{nn}(3,4) = \Sigma \tilde{i}_2(t)\cdot^*\tilde{q}_2^*(t),$$

The elements of $R_{nn}$ are symmetric about the diagonal so that $R_{nn}(j, k) = R_{nn}(k, j)$.

The correlation matrix $R_{nn}$ computed based on the filtered I and Q samples has some interesting properties that may be exploited to detect for the presence and polarity of ACI. $R_{nn}$ was computed for various operating scenarios including (1) a scenario in which ACI is present, which is referred to as an ACI scenario, (2) a scenario in which ACI and CCI are not present, which is referred to as a SEN scenario, and (3) a scenario in which only CCI is present, which is referred to as a CCI scenario. For the ACI scenario, $R_{nn}$ was computed for signal-to-interference ratios (CIRs) of 10 dB, 0 dB and −10 dB. For the SEN scenario, $R_{nn}$ was computed for energy-per-bit-to-total-noise-and-interference ratios (Eb/Nos) of 10 dB, 0 dB and −10 dB. For the CCI scenario, $R_{nn}$ was computed for CIRs of 10 dB, 0 dB and −10 dB. A total of nine cases were simulated covering three CIR or Eb/No values for each of the three operating scenarios. For each case, $R_{nn}$ was computed and averaged over a large number of bursts.

Table 1 gives the values for the elements of $R_{nn}$ for the ACI, SEN and CCI scenarios with CIR or Eb/No of −10 dB.

TABLE 1

Correlation matrix

| | ACI Scenario CIR = −10 dB | | | | SEN Scenario Eb/No = −10 dB | | | | CCI Scenario CIR = −10 dB | | | |
|---|---|---|---|---|---|---|---|---|---|---|---|---|
| | $i_1$ | $q_1$ | $i_2$ | $q_2$ | $i_1$ | $q_1$ | $i_2$ | $q_2$ | $i_1$ | $q_1$ | $i_2$ | $q_2$ |
| $i_1$ | 6.18 | 0.33 | −1.89 | 5.72 | 8.59 | 0.44 | −1.87 | −0.12 | 0.22 | 0.01 | 0.12 | 0.03 |
| $q_1$ | 0.33 | 6.59 | −5.91 | −2.03 | 0.44 | 9.07 | −0.08 | −2.01 | 0.01 | 0.24 | −0.01 | 0.13 |
| $i_2$ | −1.89 | −5.91 | 6.19 | 0.35 | −1.87 | −0.08 | 8.59 | 0.52 | 0.12 | −0.01 | 0.42 | 0.03 |
| $q_2$ | 5.72 | −2.03 | 0.35 | 6.62 | −0.12 | −2.01 | 0.52 | 9.14 | 0.03 | 0.13 | 0.03 | 0.45 |

FIG. 7A shows 3-dimensional (3-D) plots of the elements of $R_{nn}$ for the ACI scenario with CIR of −10 dB. FIG. 7B shows 3-D plots of the elements of $R_{nn}$ for the SEN scenario with Eb/No of −10 dB. FIG. 7C shows 3-D plots of the elements of $R_{nn}$ for the CCI scenario with CIR of −10 dB.

As shown in FIGS. 7A to 7C and Table 1, the correlation matrix $R_{nn}$ has distinctive patterns for the ACI, SEN and CCI scenarios. For the ACI scenario, the diagonal elements $R_{nn}(1,1)$, $R_{nn}(2,2)$, $R_{nn}(3,3)$ and $R_{nn}(4,4)$ as well as elements $R_{nn}(1,4)$ and $R_{nn}(2,3)$ have large values relative to the remaining elements of $R_{nn}$. For the SEN scenario, the diagonal elements of $R_{nn}$ have large values relative to the remaining elements. For the CCI scenario, the diagonal elements of $R_{nn}$ have slightly larger values relative to the remaining elements, but the difference is not as pronounced as for the ACI and SEN scenarios. These distinctive patterns for the elements of $R_{nn}$ may be used to detect for ACI under different operating scenarios.

ACI detection may be achieved in various manners based on the correlation matrix $R_{nn}$. In one design, certain elements of $R_{nn}$ are combined to obtain the following intermediate terms:

$$R_{diag} = \frac{1}{4} \cdot \sum_{j=1}^{4} |R_{nn}(j,j)|, \quad \text{Eq (6)}$$

$$R_{aci} = \frac{1}{2} \cdot (|R_{nn}(1,4)| + |R_{nn}(2,3)|), \quad \text{Eq (7)}$$

$$R_{sen} = \frac{1}{2} \cdot (|R_{nn}(1,3)| + |R_{nn}(2,4)|), \text{ and} \quad \text{Eq (8)}$$

$$R_{noise} = \frac{1}{2} \cdot (|R_{nn}(1,2)| + |R_{nn}(3,4)|), \quad \text{Eq (9)}$$

where "|x|" denotes the absolute value of x.

$R_{diag}$ contains the average of the diagonal elements of $R_{nn}$ and reflects the power in ACI. $R_{aci}$ contains the average of elements $R_{nn}(1,4)$ and $R_{nn}(2,3)$, which are strong in the ACI scenario. $R_{sen}$ contains the average of elements $R_{nn}(1,3)$ and $R_{nn}(2,4)$, which are relatively strong in the SEN and CCI scenarios. $R_{noise}$ contains the average of elements $R_{nn}(1,2)$ and $R_{nn}(3,4)$ and reflects the noise floor. $R_{nn}(1,2)$ is the correlation between $i_1$ and $q_1$, which are orthogonal to one another. Similarly, $R_{nn}(3,4)$ is the correlation between $i_2$ and $q_2$, which are orthogonal to one another. The relative power of these terms may be used to detect for ACI.

In one design, the presence of ACI may be detected as follows:

$$\text{Flag\_ACI=true if } R_{aci} > T_{aci} \cdot R_{diag}, \quad \text{Eq (10)}$$

$$\text{Flag\_SEN=true if } R_{aci} > T_{sen} \cdot R_{sen}, \quad \text{Eq (11)}$$

$$\text{Flag\_noise=true if } R_{aci} > T_{noise} \cdot R_{noise}, \quad \text{Eq (12)}$$

$$\text{Flag\_power=true if } P_{total} < T_{power} \cdot R_{diag}, \text{ and} \quad \text{Eq (13)}$$

$$\text{ACI\_exist=Flag\_ACI \& Flag\_SEN \& Flag\_noise \& Flag\_power}, \quad \text{Eq (14)}$$

where $T_{aci}$, $T_{sen}$, $T_{noise}$ and $T_{power}$ are thresholds used for detecting ACI.

In the above design, four flags are used to detect for the presence of ACI and are set as shown in equations (10) through (13). Each flag may be set to 'true' if the condition to the right of the flag is true and set to 'false' otherwise. Flag_ACI is used to detect for the presence of ACI based on the strength of elements $R_{nn}(1,4)$ and $R_{nn}(2,3)$ relative to $R_{diag}$. Flag_SEN is used to avoid false alarm due to the SEN scenario. Flag_noise and Flag_power are also used to avoid false alarm. False alarm refers to the detection of ACI when it is not present. In equation (14), ACI is deemed to be present when all four flags are 'true' and not present otherwise.

The thresholds $T_{aci}$, $T_{sen}$, $T_{noise}$ and $T_{power}$ may be determined as follows. For a given frequency response of highpass filter 610, four ratios $R_{aci}/R_{diag}$, $R_{aci}/R_{sen}$, $R_{aci}/R_{noise}$ and $P_{total}/R_{diag}$ may be computed for different CIR values for each of the three operating scenarios and plotted. For each ratio, three plots are obtained for the ACI, SEN and CCI scenarios. $T_{aci}$ may be selected based on the three plots for $R_{aci}/R_{diag}$ such that the plot for the ACI scenario is on one side of $T_{aci}$ and the plots for the SEN and CCI scenarios are on the other side of $T_{aci}$. Similarly, $T_{sen}$ may be selected based on $R_{aci}/R_{sen}$, $T_{noise}$ may be selected based on $R_{aci}/R_{noise}$, and $T_{power}$ may be selected based on $P_{total}/R_{diag}$.

The intermediate terms $R_{diag}$, $R_{aci}$, $R_{sen}$ and $R_{noise}$ may be computed based on the elements of $R_{nn}$, which may be dependent on the frequency response of highpass filter 610. Since the thresholds are selected based on the intermediate terms, the choice of thresholds may be dependent on the choice of highpass filter response. For a given highpass filter response selected for use, the thresholds $T_{aci}$, $T_{sen}$, $T_{noise}$ and $T_{power}$ may be selected based on $R_{diag}$, $R_{aci}$, $R_{sen}$ and $R_{noise}$ obtained for this highpass filter response such that good ACI detection performance can be achieved.

Equations (10) through (14) determine whether or not ACI is present but does not provide the polarity of the ACI. The ACI has positive polarity if it is from the higher/right RF channel at +200 KHz and has negative polarity if it is from the lower/left RF channel at −200 KHz. The polarity of the ACI may be determined based on elements $R_{nn}(1,4)$ and $R_{nn}(2,3)$.

Figure 8A:
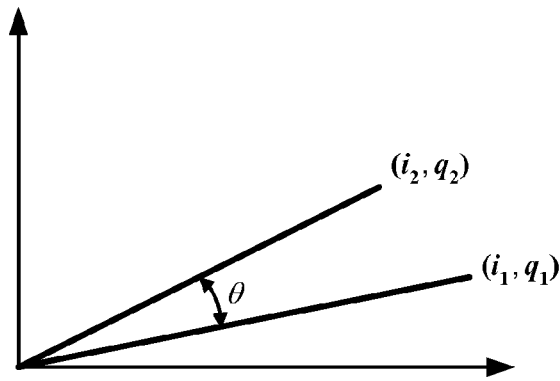
FIGS. 8A and 8B show effect of frequency offset on the I and Q samples.
Figure 8B:
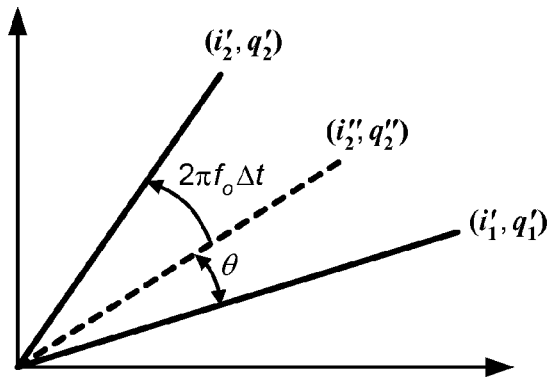

FIGS. 8A and 8B show the effect of frequency offset on the I and Q samples. FIG. 8A shows two complex samples ($i_1,q_1$) and ($q_2,q_2$) obtained in two sampling instants of one symbol period with no frequency offset between the carrier frequency of the received RF signal and a local oscillator at the receiver. In this example, the two samples are separated by an angle of θ.

FIG. 8B shows two complex samples ($i_1',q_1'$) and ($i_2',q_2'$) obtained with a frequency offset of $f_o$. Sample ($i_1,q_1$) in FIG.

8A is rotated to $(i_1', q_1')$ and sample $(i_2, q_2)$ is rotated to $(i_2', q_2')$ due to the frequency offset. Sample $(i_2', q_2')$ is one half symbol period later than sample $(i_1', q_1')$ and is thus rotated by $2\pi f_o \Delta t$ more than $(i_1', q_1')$, where $\Delta t$ is one half symbol period. Sample $(i_2'', q_2'')$ represents the hypothetical location of the second sample without the extra phase rotation of $2\pi f_o \Delta t$.

For a given frequency offset of $f_o$, $R_{nn}(1, 4)$ may be expressed as:

$$R_{nn}(1, 4) = E\{i_1' q_2'\} \quad\quad \text{Eq (15)}$$
$$= E\{i_1'[q_2'' \cos(2\pi f_o \Delta t) + i_2'' \sin(2\pi f_o \Delta t)]\}$$
$$\approx E\{i_1' i_2''\} \sin(2\pi f_o \Delta t).$$

Equation (15) assumes that $E\{i_1' q_2''\} \approx 0$, which may be verified by observing that in the SEN and CCI scenarios $q_1 \approx q_2$ and $E\{i_1 q_2\} \approx E\{i_1 q_1\} \approx 0$. This can also be observed in FIGS. 7B and 7C for the SEN and CCI scenarios where $R_{nn}(1, 4) \approx 0$.

Figure 9:
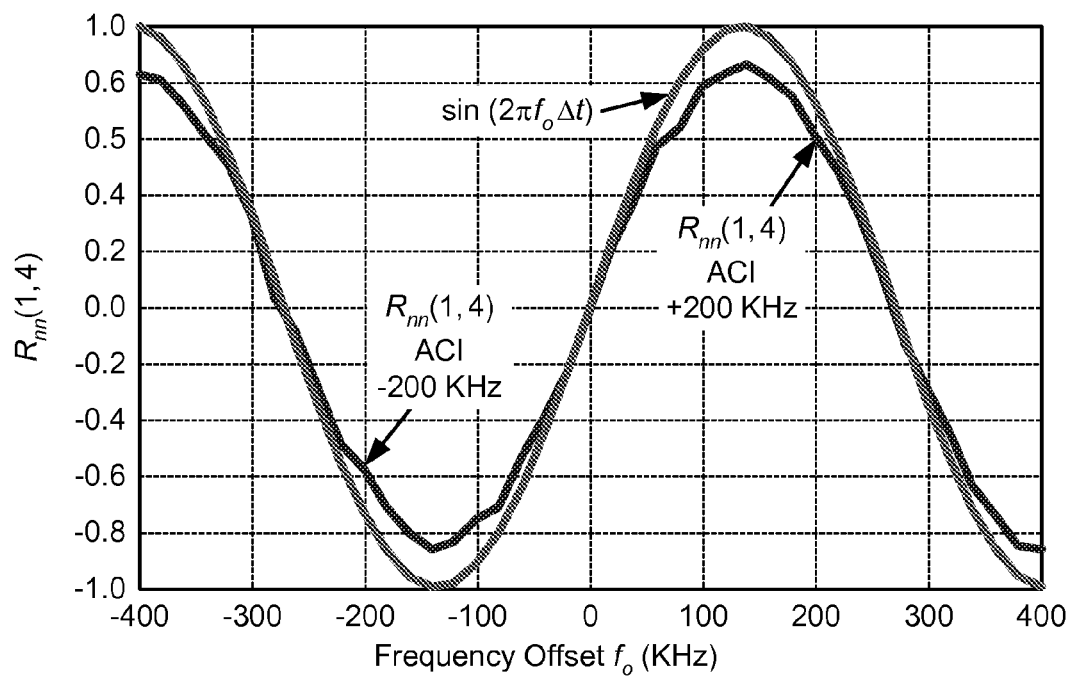
FIG. 9 shows a plot of correlation $R_{nn}$ (1, 4) for GMSK used in GSM.

FIG. 9 shows a plot of $R_{nn}(1, 4)$ for GMSK used in GSM. Statistically, $R_{nn}(1, 4)$ tracks $\sin(2\pi f_o \Delta t)$. A similar plot of $R_{nn}(1, 4)$ is obtained for 8-PSK used in EDGE. Since $\sin(2\pi f_o \Delta t)$ is an odd function of $f_o$ and since $R_{nn}(1, 4)$ closely tracks $\sin(2\pi f_o \Delta t)$, the sign of $R_{nn}(1, 4)$ may be used to detect the polarity of ACI.

The polarity of ACI may be determined as follows:

$$\text{ACI\_polarity} = \begin{cases} 1 & \text{if } R_{nn}(1, 4) > R_{nn}(2, 3) \\ 0 & \text{otherwise} \end{cases} \quad \text{Eq (16)}$$

In equation (16), ACI_polarity is set to '1' to indicate that ACI is from the higher/right RF channel if $R_{nn}(1, 4)$ is greater than $R_{nn}(2, 3)$ and is set to '0' to indicate that ACI is from the lower/left RF channel otherwise. $R_{nn}(2, 3)$ should have similar magnitude as $R_{nn}(1, 4)$ but opposite polarity. The use of both $R_{nn}(1, 4)$ and $R_{nn}(2, 3)$ may allow for robust detection of the polarity of ACI.

The ACI indicator may then be set as follows:

$$\text{ACI indicator} = \begin{cases} 0 & \text{if ACI\_exist} = 0 \\ 1 & \text{if ACI\_exist} = 1 \text{ \& ACI\_polarity} = 1 \\ 2 & \text{if ACI\_exist} = 1 \text{ \& ACI\_polarity} = 0 \end{cases} \quad \text{Eq (17)}$$

In equation (17), the ACI indicator is set to '0' to indicate no ACI, to '1' to indicate ACI from the higher RF channel at +200 KHz, and to '2' to indicate ACI from the lower RF channel at −200 KHz. Simulations indicate that ACI polarity can be detected with great accuracy when the presence of ACI is detected correctly. $R_{nn}(1, 4)$ may also be compared against a threshold, and ACI may be deemed to be present in both the higher and lower RF channels if $R_{nn}(1, 4)$ is less than the threshold.

The performance of the correlation-based ACI detector may be quantified by various metrics such as detection rate for ACI, false alarm rate in the SEN and CCI scenarios, etc. It is desirable to have high detection rate for ACI, which means that ACI can be detected in most cases when it is present. It is also desirable to have low false alarm rate in the SEN and CCI scenarios, which means that ACI is erroneously detected in only small percentage of cases when it is not present in the SEN and CCI scenarios. The correlation-based ACI detector was evaluated in different operating scenarios and across different CIR or Eb/No values for each operating scenario. The correlation-based ACI detector was found to have good detection rate for ACI and low false alarm rate in the SEN and CCI scenarios. The ACI detection performance was fairly robust with respect to the thresholds $T_{power}$, $T_{aci}$, $T_{noise}$ and $T_{sen}$.

As noted above, the frequency response of highpass filter 610 in FIG. 6 has an impact on ACI detection performance. FIG. 3B illustrates several design considerations for highpass filter 610. Filter 610 should pass the ACI at ±200 KHz, suppress the desired signal and CCI at DC, and suppress the ACI at ±400 KHz as well as the aliased images at ±140 KHz. It is desirable to avoid the ACI at ±400 KHz and its images so that this ACI does not falsely trigger the ACI detector.

In general, filter 610 may be implemented with various types of filter such as an elliptical filter, a Butterworth filter, a Chebychev filter, a Bessel filter, etc. An elliptical filter has sharp roll-off in the transition band and may provide better ACI detection performance than other types of filter. The passband ripple, transition band, and stopband attenuation are selectable design parameters for an elliptical filter. A sharp transition band may generally be obtained with larger passband ripple.

Figure 10:
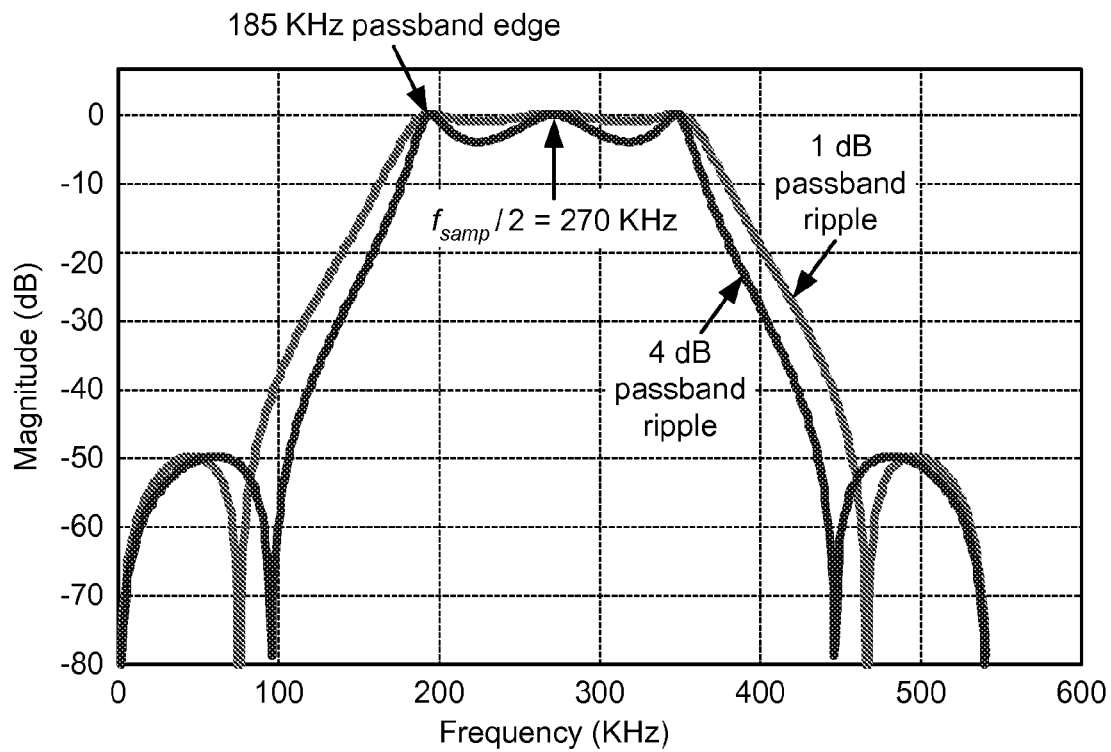
FIG. 10 shows frequency responses of two highpass filters.

FIG. 10 shows frequency responses of two third-order elliptical highpass filters. With 2× oversampling in GSM, the visible spectrum is from −270 KHz to +270 KHz, and repeats every 540 KHz in both positive and negative frequencies. The two highpass filters have the same passband edge of 185 KHz and 50 dB or more of attenuation in the stopband. However, the two filters have different passband ripples of 1 dB and 4 dB. ACI detection performance was evaluated for both filters. The filter with 4 dB passband ripple has better ACI detection performance than the filter with 1 dB passband ripple, which suggests that a sharp transition band improves ACI detection performance.

ACI detection performance was also evaluated for various third-order elliptical highpass filters with different passband edges of 100, 140, 170, 185, 200 and 240 KHz but the same 4 dB passband ripple and 50 dB attenuation. Filters with passband edges within the range of 170 to 200 KHz were found to have better ACI detection performance than filters with passband edges outside of this range.

Filter 610 may be implemented as a real highpass filter, which has reduced computation in comparison to a complex highpass filter. A real filter uses real coefficients and has a frequency response that is symmetric around DC, e.g., as shown in FIG. 3B. A real highpass filter may be sufficient to pass the ACI at +200 KHz and suppress both the ACI at +400 KHz and its image at +140 KHz. A real highpass filter may also be used since ACI polarity can be detected based on $R_{nn}(1, 4)$ and $R_{nn}(2, 3)$, as described above.

Figure 11:
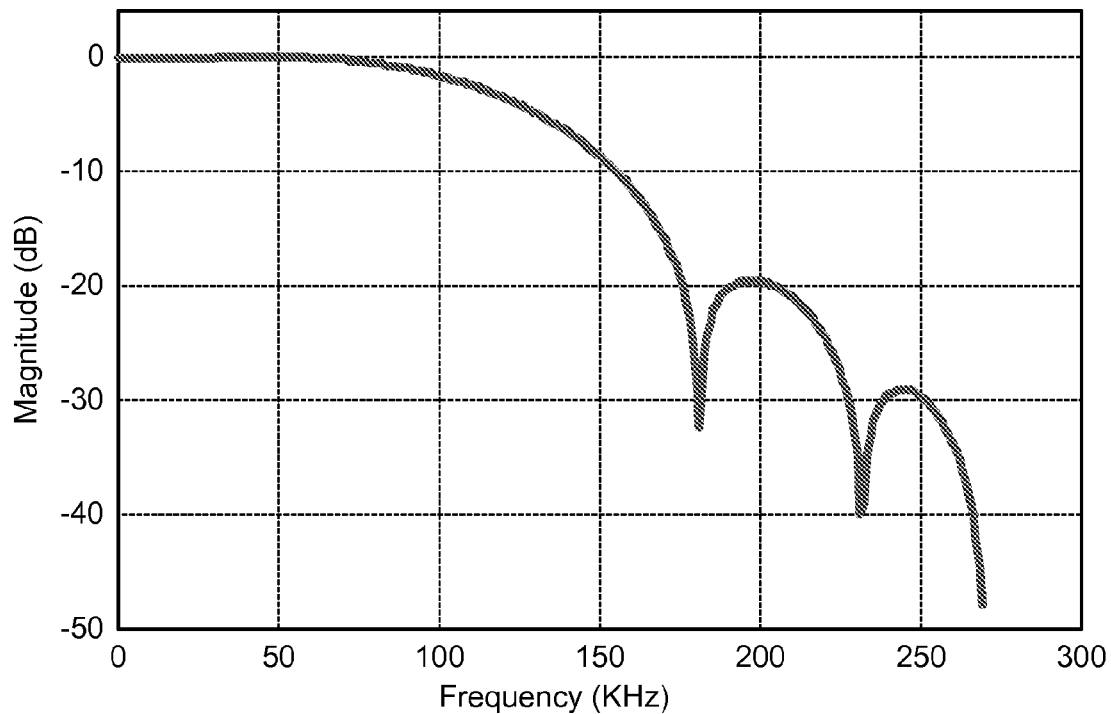
FIG. 11 shows a frequency response of a data filter at the receiver.

FIG. 11 shows an example frequency response of data filter 424 in FIG. 4. In this example, filter 424 has a bandwidth of approximately 100 KHz. In general, filter 424 may have any frequency response and any bandwidth, which may be selected to provide good performance under nominal conditions, e.g., no ACI.

The frequency response of data filter 424 may be adjusted in various manners based on the ACI indicator from ACI detector 430. In one design, the frequency response of filter 424 is shifted when ACI is detected but the bandwidth of filter 424 is not changed. The frequency response of filter 424 may be shifted lower/left by $-f_{shift}$ and away from the ACI at +200 KHz when the ACI indicator is set to '1' indicating ACI from the higher RF channel. The frequency response of filter 424 may be shifted higher/right by $+f_{shift}$ and away from the ACI at −200 KHz when the ACI indicator is set to '2' indicating ACI from the lower RF channel. The frequency response of filter 424 may be centered at DC when the ACI indicator is set to '0' indicating no ACI. In general, $f_{shift}$ may be any suitable value, e.g., 20 KHz or some other value.

In another design, the bandwidth of data filter 424 is adjusted when ACI is detected. The bandwidth may be set to $BW_{nom}$ when ACI is not detected and may be set to $BW_{small}$ when ACI is detected, where $BW_{small} < BW_{nom}$.

In yet another design, the lower and/or upper passband edges of data filter 424 may be adjusted when ACI is detected. The lower and upper passband edges may be set to $L_{nom}$ and $U_{nom}$, respectively, when ACI is not detected. The upper passband edge may be set to $U_{small}$ when the ACI indicator is set to '1' indicating ACI from the higher RF channel, where $U_{small} < U_{nom}$. The lower passband edge may be set to $L_{small}$ when the ACI indicator is set to '2' indicating ACI from the lower RF channel, where $|L_{small}| < |L_{nom}|$.

In general, the frequency response of any filter in the receive path (e.g., input filter 422 and/or data filter 424 in FIG. 4) may be adjusted based on ACI detection in order to improve performance. The filter response may also be adjusted in various manner, e.g., as described above. Proper adjustment of the filter response based on reliable detection of ACI may improve overall performance, which may be quantified by a lower frame error rate (FER), bit error rate (BER), etc.

Figure 12:
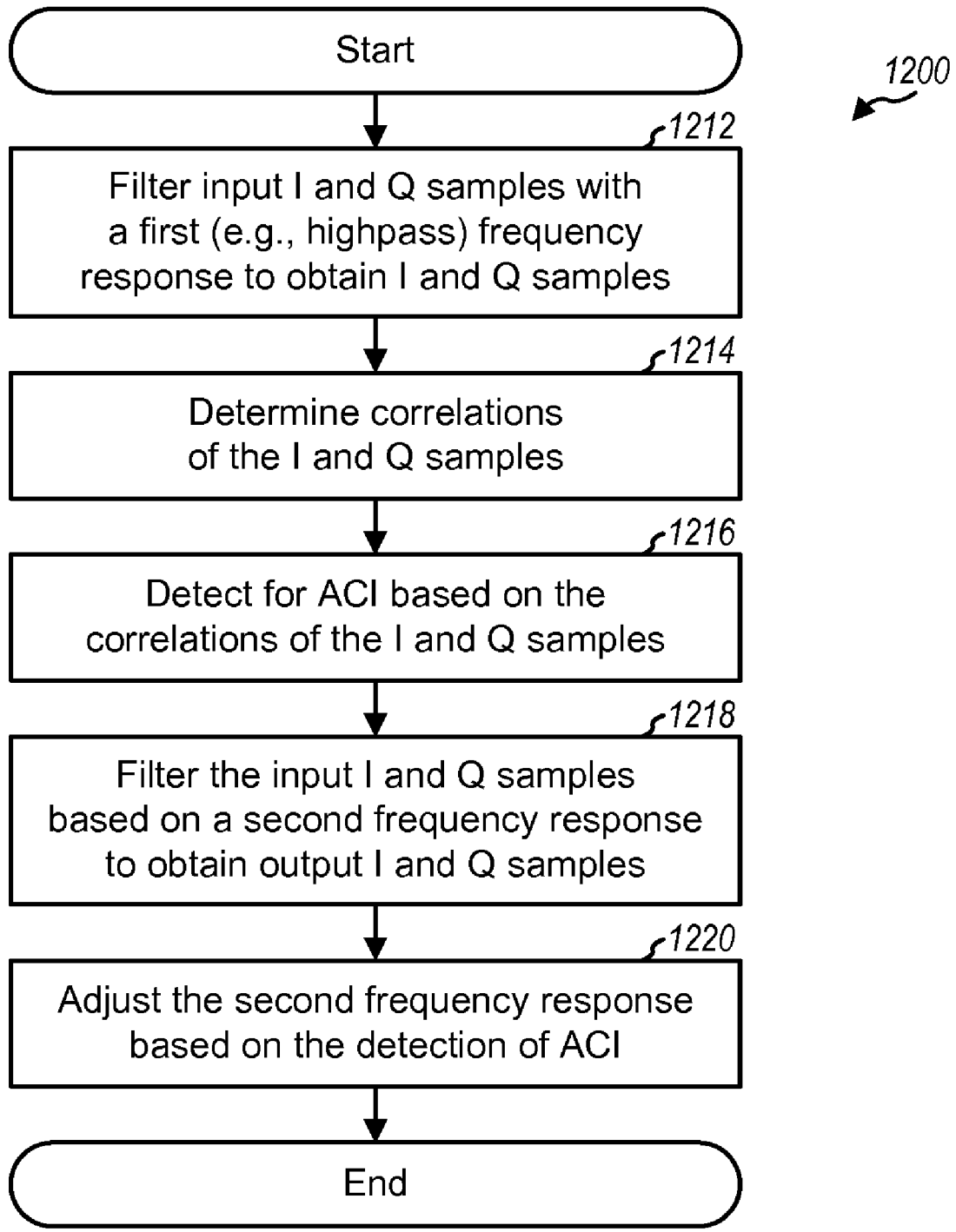
FIG. 12 shows a process for detecting and mitigating ACI.

FIG. 12 shows a process 1200 for detecting and mitigating ACI. Input I and Q samples may be obtained based on a signal received in a GSM system or some other system. The input I and Q samples may be filtered with a first (e.g., highpass) filter response to obtain I and Q samples (block 1212). The first filter response may be designed to pass signal in an adjacent frequency channel while suppressing signals in a desired frequency channel as well as non-adjacent frequency channels. The first filter response may have (a) a passband that passes at least part of the adjacent frequency channel and (b) a stopband that suppresses the desired frequency channel, a non-adjacent frequency channel two over from the desired frequency channel (e.g., the blocker at +400 KHz), and the alias image of this non-adjacent frequency channel. The filtering may be based on, e.g., a real highpass filter response to reduce complexity.

Correlations of the I and Q samples may be determined (block 1214). The I and Q samples may be oversampled at multiple times symbol rate and may comprise $i_1$, $i_2$, $q_1$ and $q_2$ samples for two sampling instances of each symbol period, e.g., as shown in FIG. 5. The correlations of the $i_1$, $i_2$, $q_1$ and $q_2$ samples may be determined, e.g., as shown in equation (4).

ACI may be detected based on the correlations of the I and Q samples (block 1216). The power of the input I and Q samples may also be determined and used to detect for ACI. Multiple intermediate terms may be computed based on the correlations of the $i_1$, $i_2$, $q_1$ and $q_2$ samples, e.g., as shown in equations (6) through (9). These multiple intermediate terms may include (1) a term $R_{diag}$ for the auto-correlations of the $i_1$, $i_2$, $q_1$ and $q_2$ samples, (2) a term $R_{aci}$ for the correlation between the $i_1$ and $q_2$ samples and the correlation between the $i_2$ and $q_1$ samples, (3) a term $R_{sen}$ for the correlation between the $i_1$ and $i_2$ samples and the correlation between the $q_1$ and $q_2$ samples, and (4) a term $R_{noise}$ for the correlation between the $i_1$ and $q_1$ samples and the correlation between the $i_2$ and $q_2$ samples.

ACI may be detected based on the intermediate terms and multiple thresholds. For example, multiple flags may be set based on the intermediate terms and the thresholds, and the presence of ACI may be determined based on these flags. If ACI is present, then whether the ACI is from a higher frequency channel or a lower frequency channel may be determined based on one or more of the correlations, e.g., the correlation between the $i_1$ and $q_2$ samples and/or the correlation between the $i_2$ and $q_1$ samples, e.g., as shown in equation (16). The ACI detection may provide an indicator that indicates whether or not ACI is present and, if present, whether the ACI is from the higher frequency channel and/or the lower frequency channel. The ACI detection may also be performed in other manners. A subset of the I and Q samples may also be used for ACI detection in order to reduce computation.

The input I and Q samples may be filtered based on a second filter response to obtain output I and Q samples (block 1218). The second filter response may be adjusted based on the detection of ACI (block 1220). For example, the second filter response may be shifted lower if ACI from the higher frequency channel is detected and shifted higher if ACI from the lower frequency channel is detected. Alternatively or additionally, the bandwidth of the second filter response may be adjusted if ACI is detected.

The techniques described herein may be implemented by various means. For example, these techniques may be implemented in hardware, firmware, software, or a combination thereof. For a hardware implementation, the processing units used to detect for ACI, filter the I and Q samples, etc., may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, and so on) that perform the functions described herein. The firmware and/or software codes may be stored in a memory (e.g., memory 182 in FIG. 1) and executed by a processor (e.g., processor 180). The memory may be implemented within the processor or external to the processor.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
   at least one processor configured to determine a correlation matrix that indicates correlations between inphase (I) and quadrature (Q) samples, and to evaluate elements of the correlation matrix to detect for adjacent channel interference (ACI) based on the correlations of the I and Q samples, wherein evaluating elements of the correlation matrix comprises determining whether the elements of the correlation matrix have a pattern that corresponds to a particular interference scenario, wherein elements of the correlation matrix are compared to determine the polarity of the ACI, wherein if a value of a first element of the correlation matrix is greater than a value of a second element of the correlation matrix, then the polarity of the ACI is positive; and a memory coupled to the at least one processor.

2. The apparatus of claim 1, wherein the at least one processor is configured to filter input I and Q samples with a filter response to obtain the I and Q samples for which the correlations are determined.

3. The apparatus of claim 2, wherein the filter response has a passband selected to pass signal in an adjacent frequency channel.

4. The apparatus of claim 3, wherein the filter response has a stopband selected to suppress signals in a desired frequency channel and at least one non-adjacent frequency channel.

5. The apparatus of claim 3, wherein the filter response has a stopband selected to suppress a non-adjacent frequency channel and an aliased image of the non-adjacent frequency channel.

6. The apparatus of claim 1, wherein the at least one processor is configured to filter input I and Q samples with a real highpass filter response to obtain the I and Q samples for which the correlations are determined.

7. The apparatus of claim 2, wherein the at least one processor is configured to determine power of the input I and Q samples separately from determining the correlation matrix, wherein the processor is further configured to detect for ACI further based on the power of the input I and Q samples.

8. The apparatus of claim 1, wherein the I and Q samples are oversampled at multiple times symbol rate and comprise $i_1$, $i_2$, $q_1$ and $q_2$ samples for two sampling instances of each symbol period, and wherein the at least one processor is configured to determine correlations of the $i_1$, $i_2$, $q_1$ and $q_2$ samples.

9. The apparatus of claim 8, wherein the at least one processor is configured to compute multiple intermediate terms based on the correlations of the $i_1$, $i_2$, $q_1$ and $q_2$ samples and to detect for ACI based on the multiple intermediate terms and multiple thresholds.

10. The apparatus of claim 9, wherein the multiple intermediate terms comprise at least one of a first term for autocorrelations of the $i_1$, $i_2$, $q_1$ and $q_2$ samples, a second term for correlation between the $i_1$ and $q_2$ samples and correlation between the $i_2$ and $q_1$ samples, a third term for correlation between the $i_1$ and $i_2$ samples and correlation between the $q_1$ and $q_2$ samples, and a fourth term for correlation between the $i_1$ and $q_1$, samples and correlation between the $i_2$ and $q_2$ samples.

11. The apparatus of claim 9, wherein the at least one processor is configured to set multiple flags based on the multiple intermediate terms and the multiple thresholds and to determine presence of ACI based on the multiple flags.

12. The apparatus of claim 8, wherein the at least one processor is configured to determine whether ACI is from a higher frequency channel or a lower frequency channel based on correlation between the $i_1$ and $q_2$ samples.

13. The apparatus of claim 12, wherein the at least one processor is configured to determine whether ACI is from the higher frequency channel or the lower frequency channel further based on correlation between the $i_2$ and $q_1$ samples.

14. The apparatus of claim 1, wherein the at least one processor is configured to obtain a first sequence of I samples and a second sequence of Q samples for a burst, and to determine the correlations of the I and Q samples based on a subset of the I samples in the first sequence and a subset of the Q samples in the second sequence.

15. The apparatus of claim 1, wherein the at least one processor is configured to filter input I and Q samples based on a filter response to obtain output I and Q samples and to adjust the filter response based on the detection of ACI.

16. The apparatus of claim 15, wherein the at least one processor is configured to shift the filter response lower if ACI from a higher frequency channel is detected and to shift the filter response higher if ACI from a lower frequency channel is detected.

17. The apparatus of claim 15, wherein the at least one processor is configured to adjust bandwidth of the filter response if ACI is detected.

18. The apparatus of claim 1, wherein the at least one processor is configured to obtain the I and Q samples based on a signal received in a Global System for Mobile Communications (GSM) system.

19. A method comprising:
determining a correlation matrix that indicates correlations between inphase (I) and quadrature (Q) samples; and
evaluating elements of the correlation matrix to detect for adjacent channel interference (ACI) based on the correlations of the I and Q samples, wherein evaluating elements of the correlation matrix comprises determining whether the elements of the correlation matrix have a pattern that corresponds to a particular interference scenario, wherein elements of the correlation matrix are compared to determine the polarity of the ACI, wherein if a value of a first element of the correlation matrix is greater than a value of a second element of the correlation matrix, then the polarity of the ACI is positive.

20. The method of claim 19, further comprising:
filtering input I and Q samples with a filter response to obtain the I and Q samples for which the correlations are determined, the filter response having a passband selected to pass signal in an adjacent frequency channel and a stopband selected to suppress signals in a desired frequency channel and at least one non-adjacent frequency channel.

21. The method of claim 19, wherein the I and Q samples are oversampled at multiple times symbol rate and comprise $i_1$, $i_2$, $q_1$ and $q_2$ samples for two sampling instances of each symbol period, and wherein the detecting for ACI comprises
computing multiple intermediate terms based on correlations of the $i_1$, $i_2$, $q_1$ and $q_2$ samples, and
detecting for ACI based on the multiple intermediate terms and multiple thresholds.

22. The method of claim 21, further comprising:
determining whether ACI is from a higher frequency channel or a lower frequency channel based on correlation between the $i_1$ and $q_2$ samples, or correlation between the $i_2$ and $q_1$ samples, or both correlations.

23. An apparatus comprising:
means for determining a correlation matrix that indicates correlations between inphase (I) and quadrature (Q) samples; and
means for evaluating elements of the correlation matrix to detect for adjacent channel interference (ACI) based on the correlations of the I and Q samples, wherein the means for evaluating elements of the correlation matrix comprises means for determining whether the elements of the correlation matrix have a pattern that corresponds to a particular interference scenario, wherein elements of the correlation matrix are compared to determine the polarity of the ACI, wherein if a value of a first element of the correlation matrix is greater than a value of a second element of the correlation matrix, then the polarity of the ACI is positive.

24. The apparatus of claim 23, wherein the I and Q samples are oversampled at multiple times symbol rate and comprise $i_1$, $i_2$, $q_1$ and $q_2$ samples for two sampling instances of each symbol period, and wherein the means for detecting for ACI comprises
   means for computing multiple intermediate terms based on correlations of the $i_1$, $i_2$, $q_1$ and $q_2$ samples, and
   means for detecting for ACI based on the multiple intermediate terms and multiple thresholds.

25. The apparatus of claim 24, further comprising:
   means for determining whether ACI is from a higher frequency channel or a lower frequency channel based on correlation between the $i_1$ and $q_2$ samples, or correlation between the $i_2$ and $q_1$ samples, or both correlations.

26. A computer program product, comprising:
   a non-transitory computer-readable medium comprising:
      code for causing a computer to determine a correlation matrix that indicates correlations between inphase (I) and quadrature (Q) samples; and
      code for evaluating elements of the correlation matrix to detect for adjacent channel interference (ACI) based on the correlations of the I and Q samples, wherein the code for evaluating elements of the correlation matrix comprises code for determining whether the elements of the correlation matrix have a pattern that corresponds to a particular interference scenario, wherein elements of the correlation matrix are compared to determine the polarity of the ACI, wherein if a value of a first element of the correlation matrix is greater than a value of a second element of the correlation matrix, then the polarity of the ACI is positive.

27. The computer program product of claim 26, and further comprising:
   code for computing multiple intermediate terms based on correlations of $i_1$, $i_2$, $q_1$ and $q_2$ samples for two sampling instances of each symbol period, and
   code for detecting for ACI based on the multiple intermediate terms and multiple thresholds.

28. The computer program product of claim 27, and further comprising:
   code for determining whether ACI is from a higher frequency channel or a lower frequency channel based on correlation between the $i_1$ and $q_2$ samples, or correlation between the $i_2$ and $q_1$ samples, or both correlations.

29. A wireless device comprising:
   at least one processor configured to determine a correlation matrix that indicates correlations between inphase (I) and quadrature (Q) samples, and to evaluate elements of the correlation matrix to detect for adjacent channel interference (ACI) based on the correlations of the I and Q samples, wherein evaluating elements of the correlation matrix comprises determining whether the elements of the correlation matrix have a pattern that corresponds to a particular interference scenario, wherein elements of the correlation matrix are compared to determine the polarity of the ACI, wherein if a value of a first element of the correlation matrix is greater than a value of a second element of the correlation matrix, then the polarity of the ACI is positive; and
   a memory coupled to the at least one processor.

30. The wireless device of claim 29, wherein the I and Q samples are oversampled at multiple times symbol rate and comprise $i_1$, $i_2$, $q_1$ and $q_2$ samples for two sampling instances of each symbol period, and wherein the at least one processor is configured to compute multiple intermediate terms based on correlations of the $i_1$, $i_2$, $q_1$ and $q_2$ samples, and to detect for ACI based on the multiple intermediate terms and multiple thresholds.

31. The wireless device of claim 30, wherein the at least one processor is configured to determine whether ACI is from a higher frequency channel or a lower frequency channel based on correlation between the $i_1$ and $q_2$ samples, or correlation between the $i_2$ and $q_1$ samples, or both correlations.

* * * * *